March 11, 1969 G. E. KEITH ET AL 3,431,660
EARTH SCRAPER WITH SLIDING VERTICAL ELEVATOR GUIDE MEANS
Filed Sept. 2, 1966
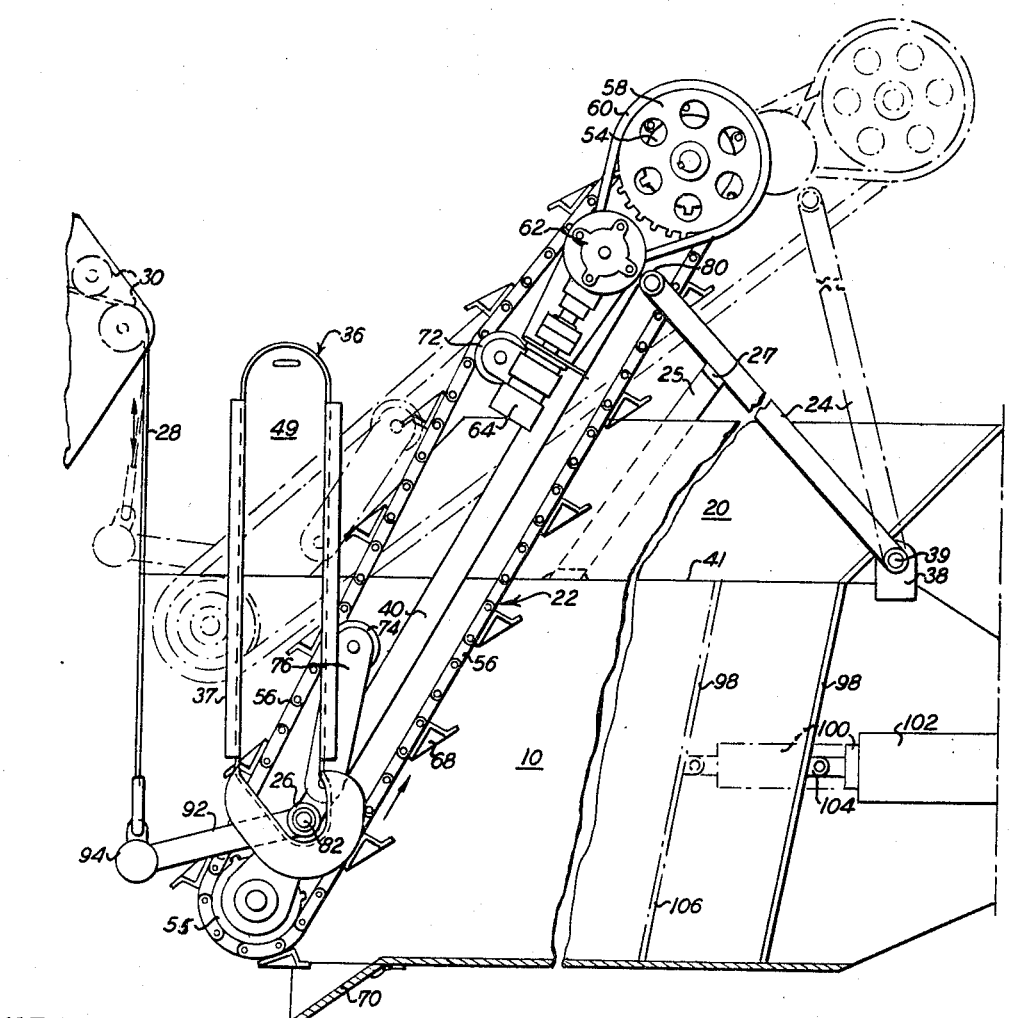
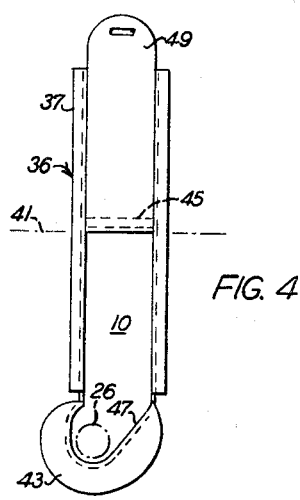
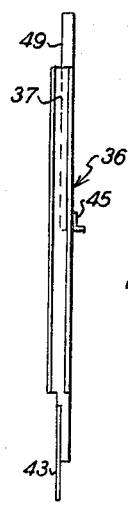
FIG. 2
FIG. 4
FIG. 5
INVENTORS
GUY E. KEITH
CALVIN L. TURNER
MAX F. MARSH
BY
Sol B. Wiczer
ATTORNEY

United States Patent Office 3,431,660
Patented Mar. 11, 1969

3,431,660
EARTH SCRAPER WITH SLIDING VERTICAL ELEVATOR GUIDE MEANS
Guy E. Keith, Calvin L. Turner, and Max F. Marsh, Casper, Wyo., assignors to Western Oil Tool & Manufacturing Company, Inc., Casper, Wyo., a corporation of Delaware
Continuation-in-part of application Ser. No. 475,606, July 28, 1965. This application Sept. 2, 1966, Ser. No. 577,051
U.S. Cl. 37—8                8 Claims
Int. Cl. E02f 3/64, 3/82; B60p 1/28

ABSTRACT OF THE DISCLOSURE

Portable earth scraper with an open mouth bowl and ejector means for ejecting the contents of the bowl through said open mouth, has a conveyor mounted to be pivotally raised above the scraper bowl clearing the mouth for easy ejecting of the bowl contents, and the forward end of the scraper has vertical guide means which constrain its movement to a vertical path in raising the conveyor to avoid possible interference during lifting motion of the conveyor and with the rearward extending portions of the tractor.

---

This invention is a continuation-in-part of our copending application Ser. No. 475,606, filed July 28, 1965, and relates to a portably mounted earth scraper bowl having a conveyor mounted therein with its lower end in dirt-conveying position near the open mouth of said bowl, and having an upper end supported by pivot arms secured to opposite sides of the bowl.

Our prior conveyor construction, while practically operative, when moving the conveyor pivotally to the rear, also tends to swing the lower forward end of the conveyor upward arcuately, sometimes interferring with certain structural elements, which necessitates modifications in many scraper constructions to accommodate this arcuate movement. It is often desired to construct a conveyor as an auxiliary element, an appurtenance which can be readily mounted as an accessory upon various scrapers by various manufacturers, useful without need to greatly modify their normal design.

More particularly, the conveyor of the present invention is substantially supported in angular loading position upon resilient side rests which maintain the lower conveyor near the open bowl mouth resiliently in digging position. A pair of side trunnions extend laterally from the lower conveyor end and are engaged and confined in lowermost digging position by a pair of J-sockets which provide resilient displacement upward and to the rear to accommodate earth irregularities, rocks and the like requiring resilient displacement for rugged digging construction of the conveyor.

A pair of guide members comprising channels or tracks are vertically mounted on opposite sides of the open mouth of the bowl and positioned and shaped to receive and guide laterally extending rollers or trunnions extending from the lower conveyor axle, the guide member being rigidly fixed to constrain the usual arcuate lifting movement of the lower conveyor end and guiding it through a direct vertically ascending path, thereby replacing and preventing the normal arcuate movement of the lower end of the conveyor according to our prior construction. This prevents interference by the arcuate movement with normally obstructing elements of various conveyor types and avoids the need to modify the same. Consequently, by the present construction any commercial conveyor may have the present guide elements fixedly mounted to receive extending trunnions from opposite ends of the lower conveyor axle to move in the vertical channel of the guide members and constrain the conveyor to such controlled vetrical movement.

The guide members, moreover, may have their lower channel ends curved rearwardly to provide a J-socket which supplies the conveyor with space to accommodate movement as an operating resilience to reduce the impact with any obstructions such as boulders encountered in digging as a built-in displacement. Thus, by use of a fixed channel guide for the lower end of the conveyor it is constrained to move only in a rigid fixed path as needed both for earth moving as a conveyor and for displacement vertically upward from the mouth of the scraper whereby it becomes most usefully available as a scraper accessory, readily mountable to any of a substantial selection of commercially available scrapers.

Accordingly, it is the object of this invention to mount the lower end of the conveyor in rigid guide members so that it may be moved vertically upward or to the rear in a fixed passageway to be readily lifted out of the scraper mouth and to avoid obstructions for easy unloading operations.

Other objects will be inherent in the description which follows made in conjunction with the drawings in which:

FIG. 2 illustrates the mounting of a conveyor in the open mouth of a scraper bowl with the side of the figure cut away to show in detail the lower guide mounting and cushioned side supports of the body of the conveyor in loading position;

FIG. 3 is an end view of the open mouth bowl having the mounted conveyor therein;

FIG. 4 is a side elevation of a guide member in detail; and

FIG. 5 is an end view of FIG. 4.

Figure 1:
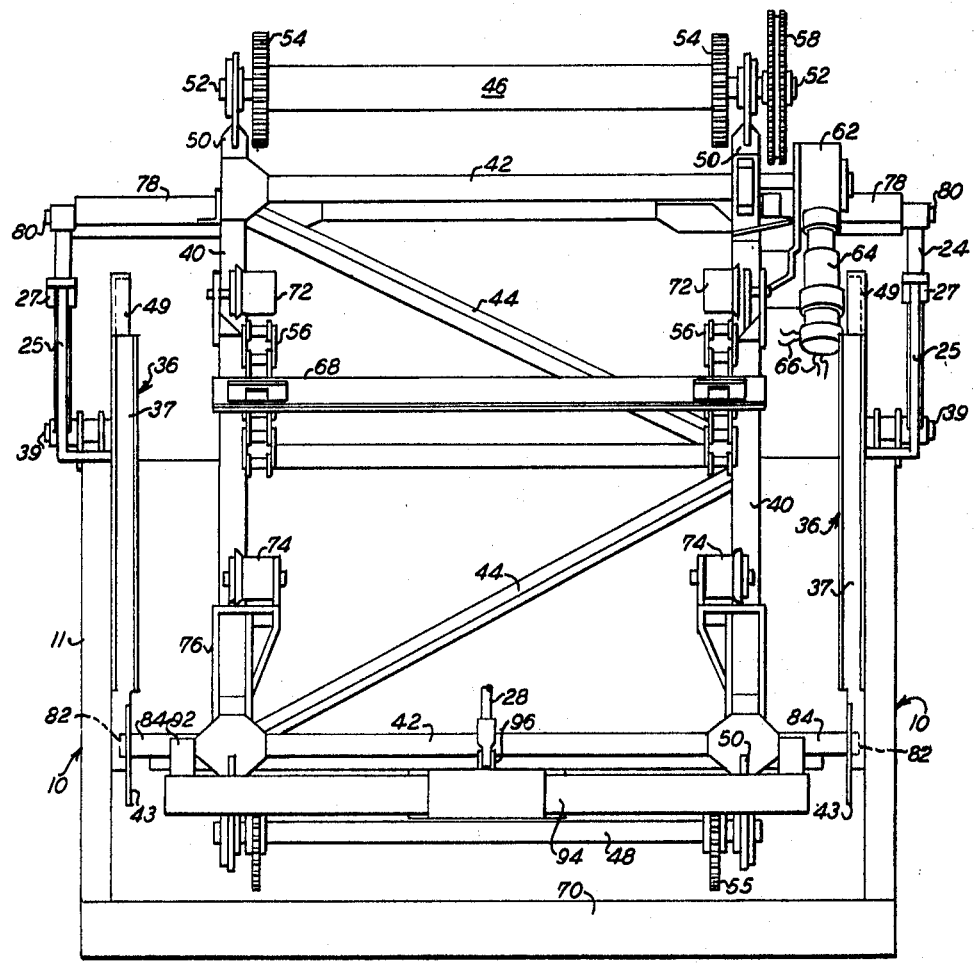
FIG. 1 is a side view of the tractor-drawn earth scraper illustrating the general arrangement of elements including the mounting of a conveyor means in raised position.

Referring first to FIG. 1, the device shown includes a scraper bowl 10 supported at the rear through wheels 12 and the front by rear wheels of a tractor 14 through a draft arm 16. The draft arm 16 is disengageably supported from a goose-neck 18, projecting from the tractor. The scraper bowl is supported while being raised and lowered from the draft arm 16 in a manner not shown, the construction thereof being conventional for scrapers. The bowl 10 has conventional side boards 20 fitted above and parallel to its sides to accommodate larger dirt loads without spillage. A loading conveyor 22 is shown supported at its upper end from a pair of pivot arms 24.

A pair of rest and support arms 25 are secured to extend angularly upward from a point near opposite upper edges 41 of the bowl 10 forward of ears 38 and are fastened at their lower ends one for each side of the bowl.

As shown in FIGS. 2 and 3, the conveyor is supported upon frame members 40 secured together by upper and lower horizontal frame members 42, diagonally stiffened by channels 44. An upper idler shaft 46 and lower idler shaft 48 are rotatably journaled in bearings in the outer ends of brackets 50 extending for support upward and downward from the corners of the frame members. Intermediately positioned on the idler shafts 46 are a pair of sprockets 54 on shaft 48 and a pair of idler wheels 55 which are rotatably supported, and about which are entrained conveyor chains 56. A drive sprocket 58 is keyed about the outer end 52 of the idler roller 46 and has a driving chain belt 60 entrained thereabout and about the driving spur of a reduction gearing unit 62 coupled to a fluid drive motor 64. Power transmissive fluid is pumped through lines 66 from a pump mounted on the tractor (not shown). Digging angles 68 are conventionally supported between the pair of chains 56 to complete the conveyor digging mechanism. In the lowered digging or scraping position of the scraper bowl, as shown in FIG. 2, the digging angle 68 cooperates with the scraper plate 70 for filling the bowl 10 with dirt in conventional manner as the conveyor is moved from between idler rollers counterclockwise, by the driving means described. The chain 56 is supported intermediately upon upper roller 72 and lower roller 74, the latter being supported upon a chain digging arm 76 adjustable in conventional manner to bear outward against the chain 56 for digging.

The upper frame member 42 has extensions 78 at its opposite ends, passing laterally the width of the scraper bowl and terminating in outwardly extending pivot pins 80 upon which are journaled for pivotal movement the upper ends of the after pivot arms 24. The lower ends of pivot arms 24 are journaled each about a pivot pin 39 parallel to and supported horizontally upon after brackets 38 upon each side edge of the bowl, as described. Thus, the entire upper frame and conveyor assembled thereon is pivotally supported by arms 24 between pivots 39 and 80 at each side.

The lower frame member 42 has an extension at its end 82 continuing as an axle 84 extending about to the side wall 11 dimensioned to clear the side walls 11 of the bowl and guide 36 thereon in vertical movement of the conveyor.

The upper end of support 25 engages an intermediate point of a pivot arm 24 and supports it as a rest arm, securing same against further lowering movement in lowered angular loading position of the conveyor 22 as shown in FIG. 2. The top of each support arm 25 is flattered by a plate covered (not shown) upon which is secured a resilient pad 27 such as rubber. The conveyor 22 is thus entirely supported by pivot arms 24 in its angular loading position secured between upper pivots 80 and the upper support arm pads 27 on which the pivot arms 24 rest.

The conveyor 22 is raised and lowered from its loading position resting on pads 27 by a wire hoist line 28 secured between a projection bar 94 extending forward from the lower end of the conveyor outward and parallel to the conveyor frame as shown. The upper end of the hoist line 28 is entrained around a sheave 30 cooperating with a winding drum 32 manually controlled from the tractor 34. The lower end of the conveyor is free for displacement in loading by upward movement from its rest arm pads 27 and its pivots 39 and 80.

The conveyor 22, as supported from support arms 24, in normal lowered digging position has its lower end extending from the open bowl mouth angularly upward therefrom as shown in FIG. 2, and is movable from the open mouth of the bowl and a raised position therefrom, clearing the mouth of the bowl as shown in FIG. 1 and the dotted line position of FIG. 2 for allowing unloading of the bowl.

The conveyor 22 is lowered from the upper position to the lower angular digging position by release of the drawing wire 28 from the winding drum 32 to rest upon the side supports 25.

Thus, upon encountering a rock or irregular or hard lumps of dirt, the entire lower end of the conveyor may be moved upward or displaced to the rear from its rest support pad 27 by resilience and movement of the pivot arm 24. The conveyor may also be raised by winding drum 34 to the dotted line position of FIG. 2. The lower end of the conveyor, however, is constrained to substantially direct vertical motion, the upper conveyor end moving back and up on pivot arm 24 to the dotted line position. The lower conveyor end, to accommodate such motion, has a pair of laterally supported trunnions secured in guide members.

For this purpose, the lower forward end of the conveyor has a pair of vertical guide members 36 welded to opposite inner sides of the bowl 10 near the mouth thereof.

The lower frame member 42 has extensions at its ends 82 continuing as axle shafts 84 extending laterally about to the side of the bowl wall 11 and dimensioned to clear the side walls 11 of the bowl and guide 36 thereon. A pair of guide rollers or trunnions 26 are mounted for rotation on shafts 84 and are confining for guiding movement of the lower end of the conveyor in guide members.

The guide members 36 are shown in FIGS. 4 and 5 and comprise a pair of side angles 37 fastened together at their upper ends to a guide bed plate 49. The bed plate 49 begins at about the height of the upper bowl frame edge 41 and forms a continuation of an inner side wall surface of the bowl 10, the side channels 37 continuing downward and being joined together by a lower J-socket or track collar member 43. Thus, the bed plate 49 rests and is secured squarely upon the upper edge 41 of the bowl frame and may be welded and braced thereto through a short angle iron member 45 whereby the plate member 49 forms a continuing surface with the side wall 11 of the bowl 10 and is bounded and further joined by side angles 37 forming a vertical guideway for trunnions 26 which are rotatably mounted upon axles 84 of the lower conveyor frame member 42.

It will be noted that at the lower end 43 of each guideway 36, FIG. 4, the J-socket is curved to the rear and the trunnions 26 are supported in conveyor loading position to fit centrally therein with substantial clearance on both sides. This central position is the normal support position of the conveyor 22 when resting upon its side supports 25.

In loading operation the various strains and movements of the lower end of the conveyor are quite resiliently accommodated with a substantial amount of play not only in the large clearance of the trunnions from the guide walls, whereby it can be resiliently pushed, even downward by the strains against the resilience accommodated in rubber pads 27, but it can also be moved sideways in either direction both by such resilience and movement of the conveyor against its pivot arms 24. Thus, there is a considerable give or play not only in the loading operation but also in the lifting movement.

Each opposite extension 84 of lower frame member 42 has a bracket arm 92 fastened thereto at one end, the pair of bracket arms 92 fastened to and supporting a horizontal elevating bar 94 between their outer ends. The bar 94 has a clevis end pin 96 pivotally securing the end of the hoisting cable 28 pivotally thereto. In operation, therefore, as the hoisting cable 28 is raised, the entire conveyor pivots upward, the forward end rising in guides 36, and the after or upper end on its pivot arms, the entire conveyor thus moving upward to the dotted line position, as shown in FIG. 1, thus completely clearing the forward open mouth end of the bowl 10 of obstruction by the conveyor.

The scraper blade 70 can be mounted integrally or pivotally supported at the bottom of the bowl, allowing adjustment of the digging angle with the lower edge of the mouth of the scraper bowl 10. The bowl 10 can be raised from the draft arm 16 or lowered to the scraping position with respect to the ground, as in conventional operation of any scraper (not shown). In drawing the scraper along the surface of the ground, a mound of dirt builds up before it and the conveyor, rotated counterclockwise digs into the loose mud or dirt, lifting and conveying it into the body of the bowl.

Any ejector mechanisms may be used as shown herein. For instance, an ejector blade 98 comprising a vertical wall may be fitted within the bowl body 10 operating as a back wall of the bowl during loading, which may be pushed forward by the piston 100 moved hydraulically from a hydraulic cylinder 102, the end of the piston being connected to the ejector blade 98 through a supporting bracket end pin 104. For ejecting the contents of the bowl, the hoist line 28 is wound on drum 32 to lift the conveyor upward, clearing the open mouth space of the bowl and, thereafter, the ejector blade 98 is pushed forward in the bowl 10 in the direction of the dotted line position 106 of the blade 98, pushing the dirt out of the open, unobstructed mouth of the bowl 10. While the forward position of the ejector plate 106 is shown intermediate to the ends of the bowl, it will be understood that the blade 98 and hydraulic piston 100 will be moved a sufficient distance to horizontally traverse the bowl 10, ejecting all of the load.

Certain modifications will occur to those skilled in the art. It is intended that the pivot and guide positions of the conveyor be selected for mounting of various types of earth scraper bowls having various types of ejector mechanisms; and even upon scraper bowls which have no ejector mechanisms, but which merely operate by tilting, etc. Consequently, it will be understood that while a hydraulic piston 100 and cylinder 102 are shown for moving an ejector plate 98 horizontally through the bowl 10 for ejecting the earth therefrom, other ejector mechanisms common in the art may be used in this combination.

Moreover, while the scraper bowl is shown mounted upon wheels being drawn by a tractor for the conveyor which is raised by a hoist line supported about pulleys and a winding drum on the tractor, the scraper bowl may be mounted on a forward end of a tractor and its scraping effected by pushing the open mouth forward over the earth for loading together with the pivotally mounted conveyor mechanism supported therein. In such construction the hoist line 28 may be supported from pulleys mounted at the rear of the scraper bowl for pivotally moving the scraper out of its angular bowl-mouth position, whereby the bowl may be dumped in any conventional manner, such as by tilting or by moving an ejector blade to push the earth out of the open, unobstructed mouth of the scraper bowl.

Accordingly, it is intended that the above description be regarded as illustrative and not limiting except as defined in the claims appended hereto.

What is claimed is:

1. An earth scraper comprising a portably mounted open mouth scraper bowl having an ejector operative to eject the contents of said bowl through the open mouth thereof and having a conveyor mountable angularly in said bowl with its lower end disposed near the bottom of the bowl mouth and its upper end near the upper portion of said bowl towards the rear thereof in earth-loading position, means for raising said conveyor substantially above said angular loading position to entirely clear said conveyor out of obstructing position of said bowl mouth for unobstructed ejection of the contents of said bowl by said ejector, and vertical guide means rigidly mounted in said bowl and positioned to slidably engage the lower end of said conveyor and guiding the movement thereof in a vertical path to said raised position substantially above obstruction of said bowl mouth as the conveyor is alternately raised and lowered.

2. An earth scraper comprising a portably mounted open mouth bowl having substantially parallel sides, ejector means for ejecting the contents of said bowl through the open mouth thereof, a conveyor disposed between said sides angularly in earth-loading position with its lower end near the bottom of the open bowl mouth and its upper end near the upper portion of said bowl toward the rear thereof, pivot arms connected pivotally near their upper ends to the upper end of said conveyor and at their lower ends each to an opposite side of said bowl providing arcuate rising movement to the upper end of said conveyor, and a pair of stop means each disposed intermediate said pivot arms and the upper sides of said bowl, said stop means intercepting said pivot arms as a support for said conveyor in said angular earth-loading position and vertical guide means rigidly mounted in said bowl and positioned to slidably engage the lower end of said conveyor and guiding the movement thereof in a vertical path to said raised position substantially above obstruction of said bowl mouth as the conveyor is alternately raised and lowered.

3. The earth scraper and conveyor construction as defined in claim 2 having means attached to the lower end of said conveyor for raising the lower end of said conveyor vertically and said upper end pivotally on said pivot arms above said angular loading position to clear said conveyor out of obstructing position of said bowl mouth.

4. The earth scraper and conveyor construction as defined in claim 2 having a pair of guide means rigidly disposed at opposite sides of said bowl mouth engaging the lower end of said conveyor and guiding the movement thereof, constraining the lower conveyor end to a vertical path as the conveyor is alternately raised and lowered, and means for engaging the lower end of the conveyor for raising said conveyor above said angular loading position.

5. A scraper structure as defined in claim 2 wherein the lower end of the conveyor has guide rollers mounted upon opposite sides of the lower end thereof and said guide means comprise a pair of rigidly disposed vertical channels forming a guideway therebetween for receiving said rollers and guiding the movement of the lower end of said conveyor in said vertical path during raising and lowering of said conveyor.

6. The scraper structure as defined in claim 5 wherein the lower end of said guideway terminates in a collar shaped to a J-socket continuing said guideway arcuately to the rear, imparting a slight arcuate movement to the conveyor when said rollers are disposed only at the lower end of said guideway.

7. An earth scraper comprising a portably mounted open mouth bowl having substantially parallel sides, ejector means for ejecting the contents of said bowl through the open mouth thereof, a conveyor disposed between said sides angularly in earth-loading position with its lower end near the bottom of the open bowl mouth and its upper end near the upper portion of said bowl toward the rear thereof, pivot arms connected pivotally near their upper ends to the upper end of said conveyor and at their lower ends each to an opposite side of said bowl, said pivot arms providing arcuate rising movement to the upper end of said conveyor, a pair of stop means each rising angularly from an upper side of said bowl to intercept and support an intermediate point of a pivot arm, each upper stop means having a resilient surface upon which said pivot arm rests in support of said conveyor, a pair of guide rollers each disposed laterally of the lower end of said conveyor, a pair of J-sockets each fastened to a lower bowl side each opposite to one of said rollers in said angular conveyor loading position, surrounding and containing said guide rollers as outer guide limits and constraining the resilient movement of the lower end of said conveyor in digging motion, said J-sockets continuing upward into vertical guideways for said rollers in vertical movement of said conveyor end and means fastened near the lower conveyor end for raising and lowering said conveyor.

8. An earth scraper comprising a portably mounted open mouth bowl having substantially parallel sides, ejector means for ejecting the contents of said bowl through the open mouth thereof, a conveyor disposed between said sides angularly in earth-loading position with its lower end near the bottom of the open bowl mouth and its upper end near the upper portion of said bowl toward the rear thereof, pivot arms connected pivotally near their upper ends to the upper end of said conveyor and at their lower ends each to an opposite side of said bowl providing arcuate rising movement to the upper end of said conveyor, and a pair of stop means each disposed intermediate said pivot arms and the upper sides of said bowl, said stop means intercepting said pivot arms as a support for said conveyor in said angular earth-loading position, cable means connected near the lower end of said conveyor for raising and lowering said conveyor above said angular loading position to clear said conveyor out of obstructing position of said bowl mouth, and vertical guide means mounted in said bowl mouth at opposite sides of the lower end of said conveyor rigidly secured to said bowl slidably engaging and constraining the forward end of said conveyor to a rigid, substantially vertical path as said conveyor is raised and lowered in said bowl by said cable means.

References Cited

UNITED STATES PATENTS

| | | |
|---|---|---|
| 1,142,197 | 6/1915 | Murphy _____ 37—8 |
| 1,860,415 | 5/1932 | Hanlon _____ 37—8 |
| 2,956,353 | 10/1960 | Hanner et al. _____ 37—8 |
| 3,191,322 | 6/1965 | Johnson et al. _____ 37—8 |
| 3,296,716 | 1/1967 | Rezabek et al. _____ 37—8 |

WILLIAM B. PENN, *Primary Examiner.*

EUGENE H. EICKHOLT, *Assistant Examiner.*

U.S. Cl. X.R.

37—125